Dec. 11, 1962 W. H. CARRIGAN ETAL 3,068,348
PORTABLE GUN TYPE WELDER
Filed Jan. 3, 1961
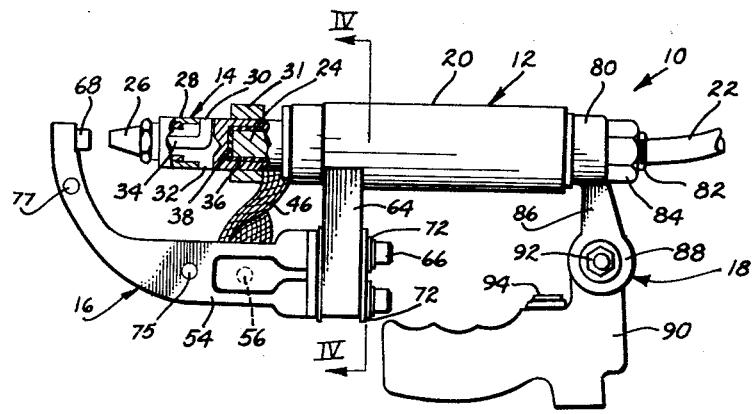
FIG. 1
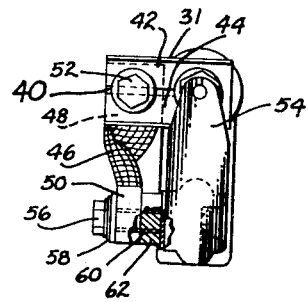
FIG. 3
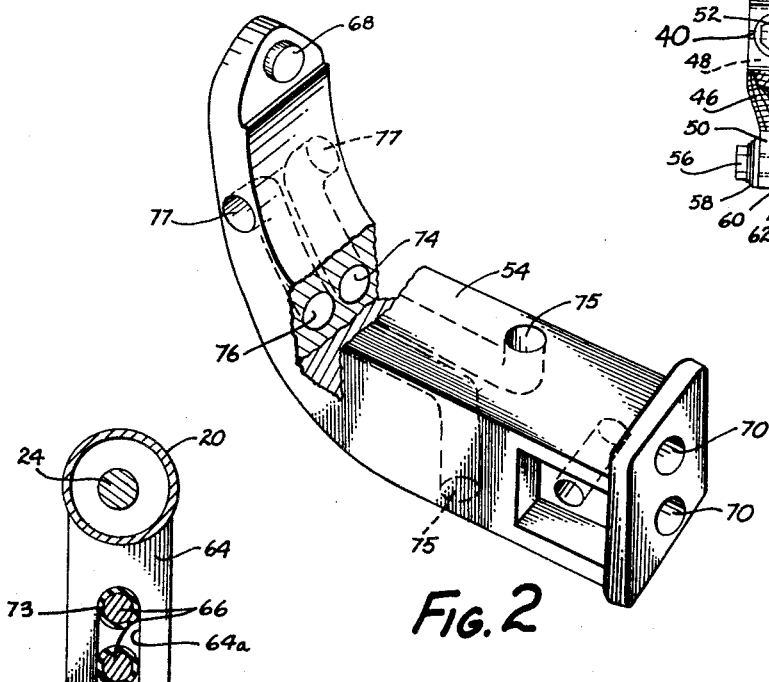
FIG. 2
FIG. 4
INVENTORS
WILLIAM H. CARRIGAN
ABRAHAM G. SIMON
BY
ATTORNEYS United States Patent Office 3,068,348
Patented Dec. 11, 1962

3,068,348
PORTABLE GUN TYPE WELDER
William H. Carrigan and Abraham G. Simon, Grand Rapids, Mich., assignors to Kirkhof Manufacturing Corporation, Grand Rapids, Mich., a corporation of Michigan
Filed Jan. 3, 1961, Ser. No. 80,140
5 Claims. (Cl. 219—89)

This invention relates to welding apparatus and more particularly to a gun type resistance welder.

Resistance welders of various types are utilized extensively today in assembly operations with high speed joining of sheet metal pieces. Such welders include the well-known gun type welder which usually possesses one fixed electrode and a second reciprocating electrode. These gun welders are complex in structure, and thus are heavy and cumbersome. The welders are generally assembled from a complexity of expensive castings and machined parts. These include a piston type fluid motor, a complex movable electrode assembly mounted on the motor, a jaw assembly of several parts for supporting the stationary electrode, and a handle assembly mounted on the unit with intermediate mounting brackets, the entirety being a space consuming, cumbersome, heavy and very expensive piece of equipment.

Thus, as can be readily appreciated, there has been a great demand for a compact gun type resistance welder which is light-weight in nature, assumes a relatively small amount of space and is quickly and cheaply manufactured. Such a welder must, however, be capable of high speed production welding including the ability to maintain a low temperature in spite of very high electrical currents conducted therethrough.

It is therefore the main object of this invention to provide a low cost, compact, light-weight welding gun which possesses all of the qualities required of a production-use resistance gun welder.

Further objects of this invention are to provide such a light-weight welder that consumes only a small amount of space, contains no complex jaw mechanism, will not overheat during rapid welding production, utilizes a handle structure that is readily attached in a simplified manner but is adjustable in all directions to suit the particular application of the welder, and has electrode assemblies lacking in complexity but capable of performing admirably under ordinary production conditions.

The above objects are accomplished by utilizing a conventional so called "fixture cylinder" in combination with novel jaw, handle, and electrode means.

These and other objects of the present invention will be apparent from a study of the specification in view of the accompanying drawings in which:

FIG. 1 is a side elevational view of the portable gun welder;

FIG. 2 is a perspective view of the jaw member in the portable gun welder;

FIG. 3 is an end elevational view of the welder when viewed from the electrode end; and FIG. 4 is a cross sectional view taken on plane IV—IV in FIG. 1.

Basically, the compact welding gun is constructed of a conventional piston motor commonly known as a "fixture cylinder." This fixture cylinder has a support member or flange secured to its outer periphery and extending radially therefrom. I utilize this motor by providing a novel electrode retainer with an electrode directly mounted to the motor drive rod, and an integral one-piece water cooled jaw electrode holder for the second electrode and mounted to the motor support flange. An adjustable handle is mounted directly onto the rear end of the motor.

Referring now to FIG. 1, the welding gun assembly comprises power motor assembly or "fixture cylinder" 12, movable electrode assembly 14, stationary electrode assembly 16, and handle and trigger assembly 18.

The power motor assembly 12 comprises a cylinder 20 containing a reciprocally mounted piston therein (not shown). The piston is actuated by pressurized fluid entering through conduit 22. This conduit is connected to hollow shaft 82 on the motor, but other conventional fluid inlets may be substituted. Such a fluid motor is very conventional and will thus not be described in detail. Fixedly attached to the piston is a rod 24 which reciprocates therewith. This rod extends through the end wall of the cylinder 20 to enable movable electrode assembly 14 to be secured thereto. Welded to the exterior wall of cylinder 20 is a bifurcated mounting flange or fork 64 having the slot 64a for receiving attachment bolts. This power motor assembly 12 is a conventional assembly commonly referred to as a "fixture cylinder" and utilized with large welding equipment on which a number of such "fixture cylinders" are mounted.

Movable electrode assembly 14 comprises electrode 26, retaining means 28 and clamp 31. The retaining sleeve 28 possesses a hollow interior as does a portion of electrode 26. These two members are secured together as by threads so that the hollow interiors thereof are operatively joined. The retainer 28 possesses a coolant inlet 30 and an outlet 32. The inlet preferably includes an elbow-shaped deflector 34. The incoming coolant stream sprays directly onto the rear face of the electrode 26. It has been found that this coolant conduit structure serves admirably to remove heat from electrode 26 and its adjacent areas. This is especially important as applied to the compact structure of this electrode assembly. The electrode retainer 28 is mounted upon rod or shaft 24 by clamp 31. Placed intermediate the retainer and the clamp is an electrically insulating bushing 36 and an insulating disc 38 at the end of the shaft to insulate the movable electrode assembly from the remainder of the apparatus. The clamp 31 possesses an elongated slot 40 to facilitate assembly. Due to this slot the clearance between the clamp opening and the shaft 24 allows it to be readily placed over the insulation 36 and 38 on the shaft. Thereafter, a suitable bolt or the like (not shown) may be utilized to draw together the two portions 42 and 44 of the clamp on both sides of the slot 40 and decrease the width of slot 40. This causes the clamp 31 to tighten down upon the insulation 36 and the shaft 24 to hold it securely thereon. This electrode assembly is greatly simplified in comparison to prior known structures. The entire structure is very short and readily manufactured and assembled. The electrode 26 itself may be quickly substituted as desired.

The clamp 31 also serves as an attachment means for electrical cable 46 which may be of the conventional flexible woven metal type. This cable 46 has two integrally attached terminal portions 48 and 50. Terminal 48 is fixedly attached to clamp 31 by bolt 52. Terminal 48 is thus in electrical contact with clamp 31, electrode retainer 28, and electrode 26. Terminal 50 may be fixedly attached to one lateral face of jaw 54 of fixed electrode assembly 16 by bolt 56. In order to electrically insulate terminal 50 from jaw 54 and bolt 56, an electrical insulation washer 58 is placed between the bolt and terminal 50, electrically insulating bushing 60 is placed around bolt 56 and wooden spacer 62 is inserted between the two. Cable 46 need not be attached to jaw 54 to obtain an operative unit.

Referring now to the fixed electrode assembly 16, this assembly includes a jaw 54, mounting bolts 66, and electrode 68. Jaw 54 is mounted unto flange 64 by bolts 66 extending through slot 64a and into threaded openings 70 in the jaw. Insulating discs 72 and bushings 73 electrically insulate jaw 54 from flange or bracket 64 and thus the remainder of the power motor 12, including handle assembly 18. This unitary flange directly and integrally attached to the surface of the motor is a simple fixture mounting fork and is in direct contrast to the complex gathering of cumbersome and very expensive castings and machined parts used in prior welding guns.

Referring to FIG. 2 it is seen how cooling conduits 74 and 76 are provided in the one-piece electrode holding jaw 54. These cooling conduits have entrances 75 and exits 77 at opposite ends of the jaw so that the conduits extend the major longitudinal distance of the jaw. Suitable hose connections may be attached in a conventional manner to supply the coolant. This novel jaw construction with its simplified, one-piece geometry is also a direct contrast to prior complex assemblies.

Referring now to FIG. 3, separate electrical connections are made to terminal 50 and jaw 54 by conventional attachment means (not shown). The connector to terminal 50 allows current to thus pass successively through terminal 50, cable 46, terminal 48, clamp 31, electrode retainer 28 and electrode 26. The electrical connection to jaw member 54 allows current to pass through this jaw to electrode 68 mounted thereon.

Handle assembly 18 is attached directly to a stud extending from the end of power motor 20. Collar 80 encircles stud 82 which is fixedly mounted to the rearward end of cylinder 20. Bolt 84 holds collar 80 and thus the handle to cylinder 20 in a secure manner. This bolt also allows the handle to be rotatably moved on stud 82 upon loosening thereof. At the lower end of bracket 86 which is integrally attached to collar 80 is a second collar 88 with its opening arranged about 90° to that of collar 80. Handle 90 is pivotally mounted to this collar via bolt 92. This very simple construction allows the gun to be used in a countless number of positions since the handle may be swiveled in the two separate planes to the desired position. Trigger 94, provided on handle 90, is operatively connected to the source of pressurized fluid in conduit 22 to operate power motor assembly 12. This connection is preferably by electrical wiring with the trigger button 94 being used to close a switch for actuating the supply valve for the pressurized fluid.

*Assembly*

The gun 10 may be assembled from the subassemblies, namely, power motor 12, handle means 18, movable electrode assembly 14, and fixed electrode assembly 16 very readily. Insulator bushing and disc 36 and 38 are positioned on the end of rod 24 of a conventional piston type power motor. Electrode retainer 28 with the electrode 26 screwed into place is slipped over this insulation and rod 24. Clamp 31 with terminal 48 attached thereto is then placed over the retainer where the latter encompasses rod 24. Next a bolt (not shown) is inserted through split clamp 31 to tighten it unto shaft 24. Insulation disc 72 and adjacent bushings 73 are positioned around bolts 66 to insulate the electrode assembly from the motor. Then fixed electrode assembly 16 with the button electrode 68 mounted unto jaw 54 is bolted to integral flange 64 of motor assembly 12. Terminal 50 is then attached to jaw 54 with bolt 56, including its insulation sleeve 60 and wooden spacer 62. Next, handle assembly 18 with its trigger button 94 is pivotally secured to bracket 86 via bolt 92, and then attached directly unto the end of motor 20 over stud 82 via collar 80. Bolt 84 is next tightened to hold this handle device in place. Cooling hoses are attached to inlet 30 and outlet 32 of movable electrode assembly 14, and the inlets 75 and outlets 77 of electrode holding jaw 54. Pressurized fluid conduit 22 for the power cylinder 20 is attached to the hollow shaft 82. Finally, electrical connections are made to terminal 50 and jaw 54 from a typical welding transformer.

*Operation*

When it is desired to weld two pieces of sheet metal or the like together the welding assembly 10 is mounted or otherwise held. The sheet metal is placed between the electrodes 26 and 68. Trigger button 94 is depressed to actuate power motor 20 via fluid pressure entering in conduit 22. This actuates the motor piston and thus the shaft 24 to cause it to move toward electrode 68. Since retaining member 28 and electrode 26 are fixedly attached to shaft 24 by clamp 31 this entire movable electrode assembly moves toward electrode 68 and presses the metal pieces therebetween. Flexible woven electrical conduit 46 allows this assembly to move without hindrance. The metal sheets are joined by the rapid current transfer through the sheets. After the welding has been completed the power cylinder is allowed to retract either by releasing trigger 94 or by utilizing conventional timing release mechanisms on the control circuit for the pressure source of the pressurized fluid. This operation may be repeated rapidly for production operation. During this time cooling liquids are passed through electrode assembly 14 and jaw assembly 16 to remove heat caused by the conductance of electrical current through these members.

Thus, it is seen that there is provided a very inexpensive, compact, and lightweight gun type welder that is completely effective for high speed production. It will be obvious to those having ordinary skill in the welding art that the above described welding gun may be modified in various ways without departing from the spirit of this invention. These modifications are intended to be included within the scope of this invention, such invention being limited only by the definitions provided in the attached claims.

We claim:

1. A welding gun comprising the combination of a power motor; a piston reciprocally mounted in said motor and having a rod extending through one end of said motor; a first electrode mounted on the extending end of said rod; a second electrode operatively spaced from said first electrode and secured indirectly through a jaw member to said motor; a cylindrical stud extending from the end of said motor opposite said first electrode; a handle bracket pivotally mounted directly on said stud; and a handle secured to said bracket on a pivotal axis in a plane normal to the pivotal axis of said bracket.

2. A welding gun comprising; the combination of a cylindrical power motor; a piston reciprocally mounted in said motor and having a rod extending through one end thereof; a first electrode mounted on the extending end of said rod; a bifurcated jaw-mounting flange secured directly to a portion of the cylindrical periphery of said motor and extending radially away therefrom; a one-piece jaw member attached to said bifurcated flange and extending into the axis of said rod and said first electrode; a second electrode mounted on said jaw on said axis and spaced from said first electrode; and handle means attached to said power motor.

3. A welding gun comprising the combination of a cylindrical power motor; a piston reciprocally mounted in said motor and having a rod extending through one end thereof; a first electrode mounted on the extending end of said rod; a mounting fork means secured directly to a portion of the cylindrical periphery of said motor and extending radially therefrom; a one-piece jaw member attached to said bifurcated flange and extending into the axis of said rod and first electrode; a second electrode mounted on said jaw and said axis and spaced from said first electrode; and handle means on said motor.

4. The welding gun in claim 2 wherein said bifurcated jaw-mounting flange comprises a fork.

5. The welding gun as claimed in claim 4 wherein said fork is welded to said peripheral portion.

References Cited in the file of this patent

UNITED STATES PATENTS

| | | |
|---|---|---|
| 1,954,426 | Platz | Apr. 10, 1934 |
| 1,993,961 | Groven et al. | Mar. 12, 1935 |
| 2,256,028 | Jardine et al. | Sept. 16, 1941 |